Dec. 16, 1969   R. R. DENMAN   3,484,327
METHOD FOR MAKING TWO-PIECE HOLLOW DEVITRIFIED MIRROR BLANK
Filed July 1, 1965   2 Sheets-Sheet 1

INVENTOR.
ROBERT R. DENMAN
BY W. A. Schack and
Clovm H. White
ATTORNEYS

Dec. 16, 1969    R. R. DENMAN    3,484,327
METHOD FOR MAKING TWO-PIECE HOLLOW DEVITRIFIED MIRROR BLANK
Filed July 1, 1965    2 Sheets-Sheet 2

INVENTOR.
Robert R. Denman
BY

ATTORNEYS

United States Patent Office 3,484,327
Patented Dec. 16, 1969

3,484,327
METHOD FOR MAKING TWO-PIECE HOLLOW DEVITRIFIED MIRROR BLANK
Robert R. Denman, Toledo, Ohio, assignor to Owens-Illinois, Inc., a corporation of Ohio
Continuation-in-part of application Ser. No. 437,432, Mar. 5, 1965. This application July 1, 1965, Ser. No. 468,762
Int. Cl. C03c 3/08
U.S. Cl. 161—1                    15 Claims

ABSTRACT OF THE DISCLOSURE

Crystallized glass ceramic or vitreous lightweight telescope mirror blanks are described formed from a transparent, base plate, which has a plurality of cavities formed in one surface thereof and a transparent, backup plate fused to the surface of the base plate which has the cavities formed therein. The backup plate is provided with a plurality of openings therethrough, each of the openings being opposite to and communicating with one of the cavities in the base plate. The base plate and the backup plate are of the same composition. The crystallized glass ceramic telescope mirror blanks are transparent and characterized by low expansion and are formed by thermal in situ crystallization after fusion of the base plate and the backup plate. Mold apparatus for making the vitreous base plate includes an open top mold having a side wall and a base and a rigid plate having dimensions corresponding to the area defined by the inner surfaces of the side wall of the mold and having cavity forming members extending downwardly from the rigid plate which provides the cavities in the base plate.

---

This application is a continuation-in-part of application Ser. No. 437,432 filed Mar. 5, 1965 and now abandoned.

This invention relates to a telescope mirror blank and telescope mirror made therefrom, and, more particularly, to a light-weight, transparent, low-expansion telescope mirror blank, to a process for making the same, and to the light-weight telescope mirror made therefrom.

Telescope mirror blanks of large diameters and thicknesses present special and difficult problems in the casting thereof and, after the reflecting surface has been carefully ground, polished, figured, and coated, in the subsequent handling and mounting of these mirrors in the telescopes. Due to the enormous weight of the larger mirrors, complex mounting means must be utilized for supporting the mirror in the telescope, care being taken to assure that the mirror is always in strain-free condition, irrespective of its position as the telescope is moved to observe different areas of the sky.

Since the condition and configuration of the reflecting surface of the finished mirror determines the accuracy of the reflected image, and since the mirror must be of sufficient rigidity so as to prevent even the slightest movement or distortion of the reflecting mirror surface, the thickness of the mirror must be substantial in order to insure such rigidity. Attempts have been made in the past to lighten the overall weight of such telescope mirrors by forming a mirror blank of a minimum thickness and then subsequently bonding the under surface of the mirror blank to glass members of the same composition, which members, as a whole, impart a certain rigidity to the ultimate reflecting mirror. One example of this is the use of an "egg-crate" construction wherein a plurality of elongated glass strips having spaced slotted portions along one longitudinally extending edge are interconnected with a plurality of similar glass strips extending at right angles thereto, the connection being at the respective slotted portions so that the final structure is of the same thickness or height as the individual strip, just as in the case of the interconnected cardboard members used with an egg crate to separate the individual eggs.

However, due to the overall size of the glass strips and the thickness of the mirror blank, considerable problems occur when the glass strips are subjected to temperatures sufficient to fuse them together along their adjoining portions and also fuse the upper surface of the interlocked "egg crate" structure to the bottom surface of the mirror blank. A glass back-up plate of sufficient thickness to impart rigidity to the mirror must also be fused to the other surface of the "egg crate" structure. Since the casting of large mirrors is a very delicate operation, and the temperature to which the glass is subjected as it is being cooled has to be very carefully controlled, it will be apparent that serious problems occur as soon as an attempt is made to fuse to the "egg crate" glass structure the bottom surface of the mirror blank and to the back-up plate. To do this successfully is a tedious, time-consuming operation which adds considerably to the cost of the final product.

Accordingly, it is an object of this invention to provide a process for forming a light-weight, reflecting vitreous mirror for a telescope, which process avoids the disadvantages which exist in the prior art.

It is another object of this invention to provide a light-weight, low-expansion, vitreous telescope mirror blank wherein the surface of the blank can be ground, polished, figured and coated, whereby the resulting mirror, when mounted within a telescope, is of a rigidity sufficient to prevent any distortion of the surface.

Another object of this invention is to provide a light-weight, transparent, low-expansion, thermally crystallized glass-ceramic telescope mirror blank having a low lineal coefficient of thermal expansion.

Still another object of this invention is to provide a process for making a light-weight, low-expansion, telescope mirror blank of substantial thickness and diameter, which may be readily cast and assembled in a minimum length of time and at a relatively low cost.

In attaining these objects, one feature resides in forming the mirror blank of two separate, superposed, adjoining sections, at least one of the sections being provided with a plurality of relatively large cavities in its adjoining surface, and then fusing the adjoining sections along the area of contact to form a rigid mirror blank having a plurality of cavities dispersed throughout its inner portion.

Another feature of the invention resides in forming the mirror blank from a thermally crystallizable glass of the $SiO_2$—$Al_2O_3$—$Li_2O$ system which, when subjected to a temperature range for a period of time, crystallizes in situ to a transparent, low-expansion, glass-ceramic containing as predominant crystalline phases lithium-containing crystalline phases, either as beta-eucryptite of beta-eucryptite-like crystals, or as beta-spodumene-like crystals, or both, as indicated by X-ray diffraction data.

A multitude of such crystalline species in random orientation and dispersed in the glass matrix remaining as a result of in situ crystallization are to be found in the glass-ceramic mirror blank of the invention. Substantially all of the crystals of the glass-ceramic are of a diameter less than ⅓ micron measured along the largest lineal dimension of the crystals.

Still another feature of this invention is to form a light-weight, transparent, glass-ceramic telescope mirror blank wherein the blank has a coefficient of lineal thermal expansion of from minus $10 \times 10^{-7}$ to $10 \times 10^{-7}$ ° C. (0–300° C.) and preferably of about zero.

Yet another feature of this invention is to form a light-weight telescope mirror blank by maintaining a molten vitreous mass within a zone while defining a plurality of cavities in one surface of the molten mass, gradually increasing the viscosity of said mass until it is self-supporting and the cavities are fully defined therein, placing a vitreous plate onto said cavity-containing surfaces, and subjecting the laminate to heat over a period of time sufficient to fuse the adjoining surfaces thereof to form a vitreous telescope mirror blank having a plurality of cavities disposed throughout its inner portion.

Other objects, features, and advantages of the invention will become more apparent from the following discussion of the invention, taken in conjunction with the drawings, wherein.

Figure 2:
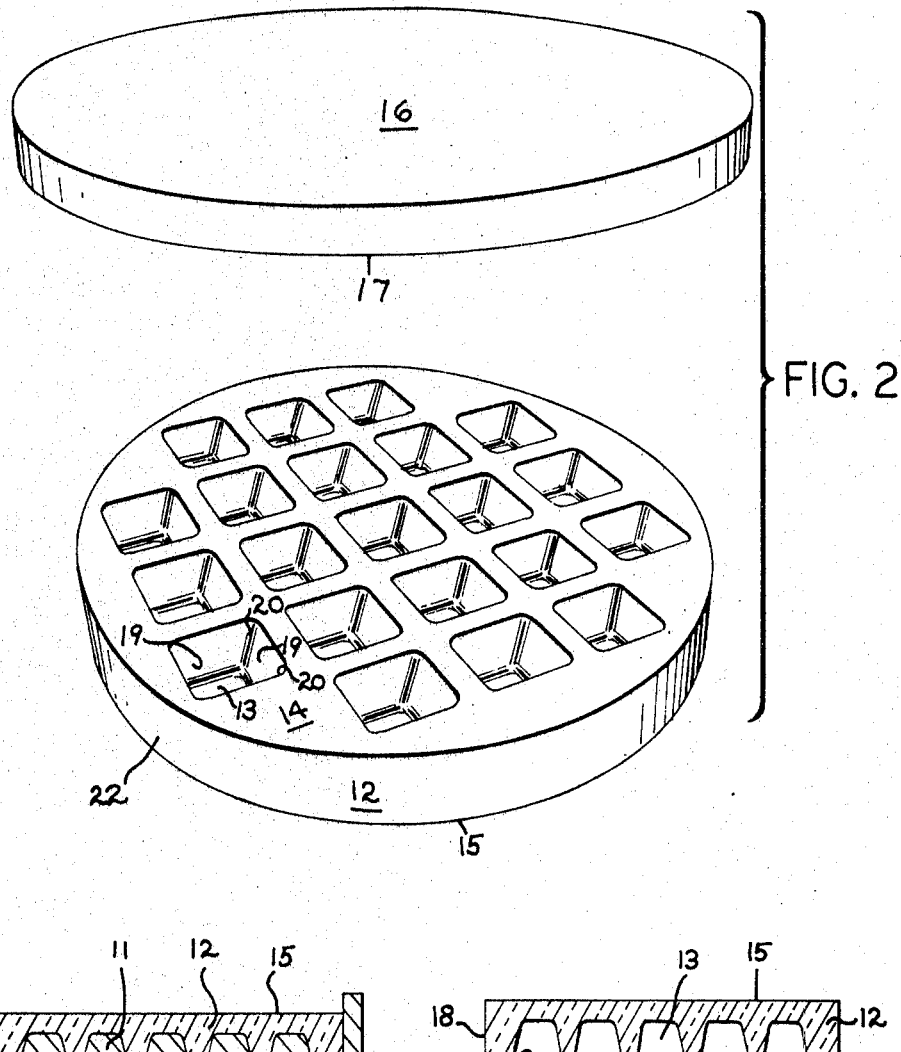
FIG. 2 is an enlarged, perspective, exploded view of an embodiment of the telescope mirror blank of the present invention.
Figure 1:
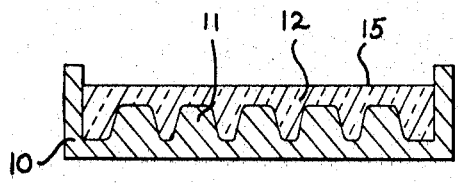
FIG. 1 is a cross-sectional view of one portion of the telescope mirror blank of the present invention, shown cast in a mold.

In practicing the invention, the vitreous base plate portion of the mirror blank may be formed by adding a molten vitreous mass to an annular mold 10 which is provided with a plurality of upwardly and inwardly tapering rectangular projections 11, as illustrated in FIG. 1. Upon cooling and subsequent removal from the mold, the base plate 12 has a plurality of downwardly and inwardly tapering cavities 13 formed therein on one surface thereof, as illustrated in FIG. 2. The surface 15 opposite the cavity-containing surface 14 ultimately will form the reflecting surface of the mirror.

An annular vitreous back-up plate 16 of the same diameter as the base plate 12 has one of its surfaces 17 placed in adjoining relationship with the surface 14 of the base plate 12, and the two-piece glass body is heat-treated until the adjoining surfaces 14, 17 are fused to form a vitreous mirror blank 18 having a plurality of cavities 13 disposed throughout its inner portion.

As illustrated in FIG. 2, the cavities 13 assume the configuration of the projections 11 of the mold 10. While the upwardly and outwardly tapering sides 19 may meet to form a sharp corner (not shown) when the glass composition of the base plate is of fused silica, borosilicate glass, or similar glasses, the corners 20 must be rounded when the composition of the base plate 12 is of a thermally crystallizable glass, so as to avoid uncontrolled crystallization which may occur at the sharp corners and thus materially affect the quality and properties of the resulting mirror blank.

Figure 3:
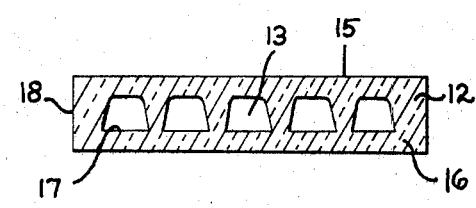
FIG. 3 is a cross-sectional view of an embodiment of the telescope mirror blank of the present invention.
Figure 4:
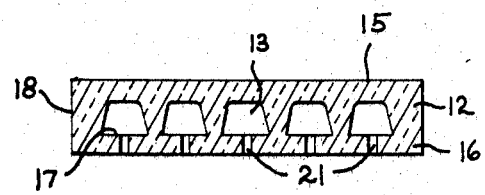
FIG. 4 is a cross-sectional view of another embodiment of the telescope mirror blank of the present invention.

The transparent mirror blank 18 made in accordance with the invention has the appearance of a one-piece unit, as illustrated in FIG. 3, wherein the cavities are substantially in the center of the mirror blank in relation to its thickness. If desired, it is possible to provide a plurality of openings 21 extending through the thickness of the back-up plate 16 wherein each opening is disposed opposite to and in communication with one of the cavities 13 of base plate 12, as illustrated in FIG. 4. The size of these openings 21, their number and their spacing relative to adjacent openings 21 are such that there is no substantial reduction in rigidity of blank 18 afforded by plate 16 fused to base plate 12 as compared with plate 16 without openings 21. Alternatively, the openings can extend laterally through the sidewall 22 (not shown) of base plate 12 and through the projection 11 to interconnect each or some of the cavities, and thus provide a passage to the outside atmosphere. However, in view of the extremely high temperatures at which the vitreous mirror blank of the present invention is formed, the fact that the cavities 13 are sealed off from the outside atmosphere will not affect the operation of a reflecting telescope mirror made from the blank, since the changes in atmospheric conditions during the operation of a telescope containing the mirror will not cause sufficient expansion of the gases in the cavities to affect the reflecting characteristics of the mirror.

In the embodiment illustrated in FIG. 1, the molten vitreous composition may be poured into the mold or, alternatively, the mold may be filled with vitreous cullet which is then heated to a temperature sufficient to melt it within the mold.

Figure 5:
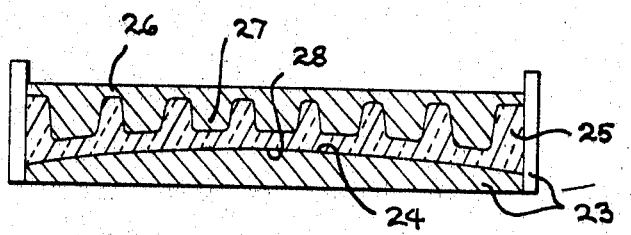
FIG. 5 is a cross-sectional view of one portion of the telescope mirror blank of the present invention, shown cast in a mold.

In the embodiment illustrated in FIG. 5, a split-ring mold 23, instead of being provided with the projections 11, can have a substantially flat bottom surface or, as shown in FIG. 5, its bottom surface 34 may be of a convex configuration. While a molten glass composition 25 is maintained in the mold 23, a plate 26 having a plurality of downwardly and inwardly tapering projections 27 of a configuration similar to projections 11 set forth in FIG. 1, can be immersed (by means not shown) into the molten glass 25 and held there for a time until the viscosity of the glass is increased, such as by cooling, to a point that the glass is self-supporting and the cavities formed therein are well defined after removal of the plate 26 from the mold. The bottom surface 28 of the shaped base plate formed in the mold, now having a concave configuration, materially decreases the work necessary on grinding, figuring, and polishing the surface 28 prior to coating it with a reflecting material, such as aluminum, by procedures well known in the art.

If a concave surface 15 is desired in base plate 12 of FIG. 2, this can readily be achieved by inserting a face plate (not shown) having a convex surface into the molten glass composition wtihin the mold shown in FIG. 1. By having such a face plate of the same diameter as the inner diameter of the mold 10, and inserting such a face plate downwardly into the mold so that the molten glass occupies all of the space within the mold, and then holding the face plate in this position until the viscosity of the glass has increased to a point where the glass is self-supporting, a concave surface is formed on the glass base plate.

The following example is merely illustrative of an embodiment of the invention, and it is to be understood that the scope of the invention is not to be considered limited in any manner thereby.

EXAMPLE 1

A thermally crystallizable molten glass having a temperature within the range of 2650–2750° F. was poured into a split-ring graphite mold which had been preheated to 400° F. The mold being 16″ in diameter, it took approximately 15 seconds to pour the molten glass therein to a depth of two inches. A graphite assembly, consisting of a plate having a plurality of downwardly and inwardly tapering rectangular projections (such as that illustrated in FIG. 5), was inserted into the mold with the projections immersed into the molten glass and held in contact therewith for 10 seconds, at the end of which time the viscosity of the glass was sufficiently high, due to cooling thereof, as to retain the shape of the rectangular projections of the assembly. The assembly was then lifted out of the mold and the split ring mold was opened, thus leaving the molded glass base plate supported by the bottom surface of the mold. The total elapsed time of the base plate in the mold was from 1½ to 2½ minutes. The cavities were each 2 inches square at the upper surface of the base plate, ¾ inch square at the bottom, and were about 1½ inches deep, and were symmetrically arranged in the base plate. All corners and edges of the cavities were rounded.

Approximately thirty seconds after the flow of molten glass into the mold, as described above, had ceased, a back-up plate of the same thermally crystallizable glass was formed by pouring the molten glass, again having a temperature within the range of 2650–2750° F., into a 16 inch diameter graphite mold having a smooth bottom surface. It took ten seconds to pour the molten glass into the mold to a depth of 1½ inches. As soon as the viscosity of the glass was high enough to make the cast back-up plate self-supporting, the mold was immediately inverted so that the uppermost surface of the back-up plate was placed upon and aligned with the top surface of the separately formed base plate (in the manner illustrated in FIG. 2). The temperature of the base plate and back-up plate was approximately 1300–1700° F. by this time. The two-piece glass assembly was then placed in an oven which had been preheated to a temperature of 1000° F. and the temperature in the oven increased to 1150° F. due to the presence of the heated glass, and the assembly was maintained in the oven for a period of three hours at this temperature. The total elapsed time from the pouring of the molten glass into the base plate mold and the placing of the two-piece assembly into the oven was approximately 3 to 4 minutes.

The temperature in the oven was then increased to 1350° F. at the rate of about 5° F. per minute, and the assembly maintained therein for 50 hours at this temperature. At the end of this time, the assembly was cooled at the rate of 1° F. per minute until the temperature of 1000° F. was reached, and then the cooling rate was increased to slightly less than 5° F. per minute until room temperature was reached. A transparent mirror blank having a plurality of cavities disposed throughout its inner portion was formed. It had a coefficient of lineal thermal expansion of zero$\pm 1 \times 10^{-7}$/° C. (0–300° C.).

The thermally crystallizable glass used in the foregoing example, which produced a thermally, in situ, crystallized transparent glass-ceramic telescope mirror blank was prepared by first melting together the following batch ingredients expressed in pounds and ounces:

Ingredients: Parts
Petalite [1] _____ 405 lbs., 14 oz.
Zircon sand [2] _____ 39 lbs., 1 oz.
Alumina [3] _____ 15 lbs., 2.5 oz.
Boric acid [4] _____ 30 lbs., 5 oz.
High-calcium limestone [5] _____ 24 lbs., 8.5 oz.
Zinc oxide _____ 6 lbs., 5 oz.
Lithium carbonate _____ 5 lbs., 5 oz.
Titanium dioxide [6] _____ 9 lbs., 1.5 oz.
Niter _____ 1 lb., 4 oz.
Sodium antimonate _____ 1 lb., 11 oz.

[1] 4.2% $Li_2O$, 16.1% $Al_2O_3$, 77.7% $SiO_2$, 0.4% $Na_2O$, 0.027% $Fe_2O_3$, and other minor ingredients, including ignition loss.
[2] Analysis of zircon sand is 33.8% $SiO_2$, 65.5% $ZrO_2$, 0.12% $TiO_2$, 0.05% $Fe_2O_3$, 0.24% $Al_2O_3$, and 0.2% cerium oxide and possibly rare earth oxide.
[3] Weight of Alcoa A-14 alumina which is illustratively 99.5% $Al_2O_3$, 0.03% $Fe_2O_3$, 0.10% $Na_2O$, 0.08% $SiO_2$, 0.2% ignition loss at 1100° C.
[4] 56.2% $B_2O_3$.
[5] Limestone analyzing 55.25% CaO, 0.26% MgO, 0.5% $SiO_2$, 0.2% $Al_2O_3$, 0.05% $Fe_2O_3$, 0.001% $Cr_2O_3$, 0.03% sulfate ($SO_3$), 0.02% $P_2O_5$ and an ignition loss of 43.6%.
[6] Weight of Titanox-GM which is a non-pigmentary grade of substantially pure $TiO_2$ sold by Titanium Pigment Corporation.

This glass has the following theoretical composition and for an actual tank batch had the following analyzed composition expressed as various oxides in weight percent:

|  | Theoretical, percent | Analyzed, percent |
| --- | --- | --- |
| $SiO_2$ | 64.0 | 63.7 |
| $Al_2O_3$ | 20.9 | 21.4 |
| CaO | 2.7 | 2.8 |
| ZnO | 1.3 | 0.98 |
| $Li_2O$ | 3.9 | 3.80 |
| $B_2O_3$ | 3.4 | 2.96 |
| $TiO_2$ | 1.8 | 1.91 |
| $ZrO_2$ | 2.0 | 1.98 |
| $K_2O$ | 0.2 | 0.18 |
| $Na_2O$ |  | 0.65 |
| $Sb_2O_3$ | 0.4 | 0.32 |

The differences between theoretical and actual compositions are believed to be due primarily to alumina pick-up from the refractory of the furnace and to $B_2O_3$ and ZnO losses by volatilization.

Based upon the heat treatment, as described above, that is given to this glass the glass-ceramic obtained should have a thermal coefficient of expansion of minus $0.2 \times 10^{-7}$ per ° C. (0–300° C).

Another example of a preferred thermally crystallizable glass which by suitable heat treatment as described below can produce an astronomical telescope mirror blank of glass-ceramic with a thermal coefficient of expansion of $0 \times 10^{-7}$ per ° C. (0–300° C.) is described below. The heat treatment for this glass differs from that described above in that the temperature of the oven in which the molded glass is placed after the maintenance at 1150° F. for a period of three hours is raised to 1425° F. at the rate of about 5° F. per minute, instead of 1350° F., and is maintained at 1425° F. for 48 hours. Otherwise, the process is that described above for Example 1.

This glass is prepared by first melting together the following batch ingredients expressed in parts by weight:

Ingredients: Parts
Petalite [1] _____ 427 lbs., 14 oz.
Zircon sand [2] _____ 15 lbs., 2 oz.
Alumina [3] _____ 35 lbs., 8 oz.
High-calcium limestone [4] _____ 24 lbs., 9 oz.
Zinc oxide _____ 6 lbs., 5 oz.
Lithium chloride _____ 2 lbs., 9 oz.
Lithium nitrate _____ 1 lb., 7 oz.
Titanium dioxide [5] _____ 9 lbs., 2 oz.
Sodium antimonate _____ 2 lbs., 8 oz.

[1] Petalite composition is as described above following the tabulation of batch ingredients for the other glass described in detail.
[2] Zircon sand is also as described earlier.
[3] Weight of Alcoa A-14 alumina which is illustratively 99.6% $Al_2O_3$, 0.03% $Fe_2O_3$, 0.04% $Na_2O$, 0.12% $SiO_2$, 0.2% ignition loss at 1100° C.
[4] Limestone is also as described above.
[5] Weight of Titanox-GM which is also described above.

This glass has the following theoretical composition and for an actual tank batch had the following analyzed composition, expressed as various oxides and one chemical element in weight percent:

|  | Theoretical, percent | Analyzed, percent |
| --- | --- | --- |
| $SiO_2$ | 67.4 | 67.5 |
| $Al_2O_3$ | 20.9 | 22.1 |
| CaO | 2.7 | 2.6 |
| ZnO | 1.3 | 0.5 |
| $Li_2O$ | 3.9 | 3.59 |
| $TiO_2$ | 1.8 | 1.9 |
| $ZrO_2$ | 2.0 | 1.95 |
| $Na_2O$ | 0.5 | 0.80 |
| Cl | 0.2 | (*) |
| $Sb_2O_3$ | 0.4 | (*) |

*Not analyzed.

The differences are believed to be due to alumina pick-up and volatilization loss in the case of ZnO.

While telescope mirror blanks of the present invention may be formed utilizing known vitreous compositions which have been shown to be suitable for telescope mirrors in the past, it is preferred to utilize thermally crystallizable glasses of the $SiO_2$—$Al_2O_3$—$Li_2O$ system, capable of being thermally, in situ, crystallized to form transparent glass-ceramic having a coefficient of lineal thermal expansion which is low and preferably is about zero.

Transparent, low-expansion, glass-ceramic telescope mirror blanks may be formed by thermal in situ crystallization of the preferred thermally crystallizable base glass composition of the present invention, which composition consists essentially of the following components, in the indicated percent limits, based on the total glass composition:

| Component | Weight percent |
|---|---|
| $SiO_2$ | 56–68 |
| $Al_2O_3$ | 18–27 |
| $Li_2O$ | 3.4–4.5 |
| $CaO$ | 0–3 |
| $ZnO$ | 0–2 |
| $B_2O_3$ | 0–4 |
| $TiO_2$ | 0–6 |
| $ZrO_2$ | 0–3 |
| $MgO$ | 0–3 |
| $Na_2O$ | 0–1 |
| $P_2O_5$ | 0–3 |
| $(SiO_2+Al_2O_3)$ | <82 |
| $(SiO_2+Al_2O_3+B_2O_3+P_2O_5)$ | 86–91 |
| $(CaO+MgO+ZnO+Na_2O)$ | 2.5–6 |
| $(SiO_2+Al_2O_3+P_2O_5+Li_2O)$ | >93 |
| $(TiO_2+ZrO_2)$ | 2–6 | wherein the ratio of $(CaO+MgO+ZnO+Na_2O+B_2O_3)$ to $Li_2O$ is less than 2.4 and the ratio of $SiO_2$ to $Al_2O_3$ is no more than 3.8 and preferably no more than 3.3. Good results are also obtained when the amount of $SiO_2$ is up to 70 weight percent.

For uses of glasses and crystalline ceramics of the invention that require holding the formed glass objects for an extended time in temperature ranges where crystallization can take place, given long enough time, it has found that the amount of $TiO_2$ plus $ZrO_2$ should be limited to a maximum of about 3 weight percent and that the $TiO_2$ should be limited to about 1.5 percent of the glass composition. Usually the range of $TiO_2$ is from about 1 to about 1.5 percent in this aspect of the invention, particularly when making large objects, such as very thick telescope mirror blanks having very large diameters, which blanks require a very long annealing time during which the glass must not prematurely crystallize.

The transparent, crystallized glass-ceramic formed contains as predominant crystalline species lithium-containing crystalline phases selected from the group consisting of beta-eucryptite or beta-eucryptite-like crystals, or as beta-spodumene or beta-spodumene-like crystals, or both, as indicated by X-ray diffraction data. The ceramic contains a multitude of such crystalline species which are in random orientation throughout the ceramic and which are dispersed in the glassy matrix remaining as a result of the in situ crystallization. Substantially all of the crystals of the ceramic are of a diameter less than ⅓ micron measured along the largest lineal dimension of the crystals. The glass-ceramic has a lineal coefficient of thermal expansion of about minus $10 \times 10^{-7}$ to $10 \times 10^{-7}$ (0–300° C.) and, preferably, from $-3$ to $3 \times 10^{-7}$ (0–300° C.). The ultimate telescope mirror blank and telescope mirror formed therefrom is one in which the lineal coefficient of thermal expansion of the glass-ceramic is about zero. Furthermore, while the diameter of the crystals within the ceramic is preferably less than ⅓ micron measured along the largest lineal dimension of the crystals, it is preferred that the crystals be of a diameter less than ¼ micron in size, and best results are evident when the diameter is less than ¹⁄₁₀ micron in size.

Other transparent, low-expansion, crystallized glass-ceramics formed by thermal in situ crystallization of a thermally crystallizable base glass are disclosed in copending application Ser. No. 396,011 filed Sept. 14, 1964, now abandoned, and in copending application Ser. No. 386,693 filed July 31, 1964 and now abandoned, and in the continuation-in-part applications of each which were subsequently filed, all applications being assigned to the assignee of the present application. All of the disclosures in the aforesaid applications relating to thermally crystallizable glass compositions and the process of heat treating said compositions to form transparent, low-expansion glass-ceramics of substantial thickness and diameter are incorporated herein by reference. As fully disclosed in the aforesaid pending applications, the final coefficient of thermal expansion of the glass-ceramic is determined by the composition of the thermally crystallizable glass and by the particular heat treatment to which it is subjected.

A transparent, low-expansion telescope mirror blank of the present invention, formed by the process disclosed herein, has its base plate surface, which is preferably concave, ground, polished and figured, i.e., a proper parabolic curve is formed on the surface. A thin coating of aluminum is then applied to the prepared surface in a conventional manner to form the reflecting surface.

Figure 6:
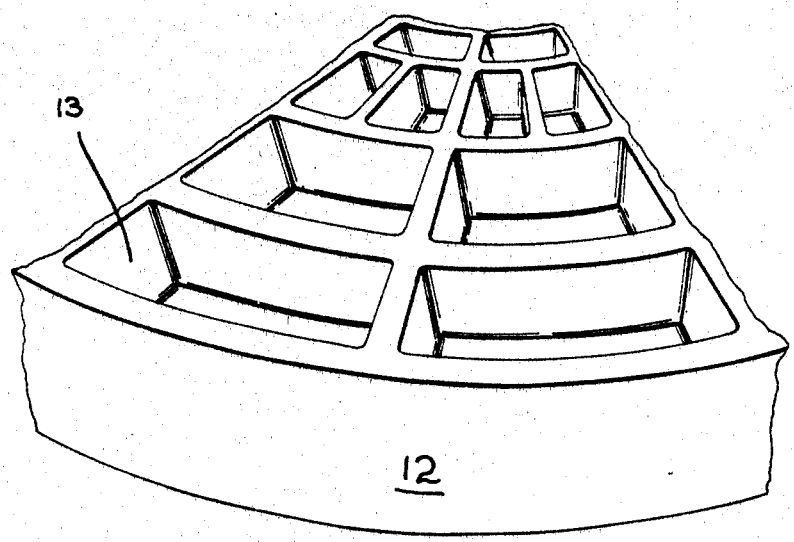
FIG. 6 is a fragmentary view of another embodiment of the base plate of the invention.

Furthermore, it is preferred that when the mirror blanks of the present invention are to be made from a thermally crystallizable glass the projections 11 should have rounded edges and corners to prevent uncontrolled devitrification to occur at any sharp juncture. While the projections 11 have been shown as rectangular and tapered, it is to be understood that other shapes may be utilized to form the mirror blank of the present invention as shown in FIG. 6 of the drawing.

Also, while the cross-sectional area of the cavity is shown in FIG. 2 as being larger at the surface of the plate 12 than at the bottom of the cavity, it is to be understood that this is not to be a limiting factor. It is possible to use as cavity-producing elements or projections, separate shaped units which are detachably secured to the bottom of the mold 10 or bottom of plate 26 and which form a part of the mirror blank during the treating step. The units are of a material which is not adversely affected by the high temperature encountered during the process and yet is easily removable by chipping, scraping, cutting or the like. This permits formation of a cavity wherein the larger cross-sectional area is within the mirror blank and the smaller area at the surface of the blank. An example of such material is shaped, open cell type amorphous fused silica foam available under the trademark "Glasrock Foam Block #25" from Glasrock Products, Inc. of Atlanta, Georgia. The amorphous silica which is at least 98% pure silica with $Al_2O_3$ being the major impurity, has a linear coefficient of thermal expansion of $0.54 \times 10^{-6}$ per ° C. (0–1000° C.) and can withstand thermal shocks of up to 3100° F. The bulk density is between 23 and 28 lb./cu. ft.

In carrying out the present invention, it is possible to modify the process to utilize the invention of George E. Keefer disclosed in his patent application entitled "Product and Method for Making Same," Ser. No. 503,831, said invention being assignable to the assignee of the present application. The Keefer invention uses the process in which the projections 11 can be made of metal, such as an aluminum alloy. When these projections 11 are hollow, they are water cooled until one wishes to remove the projections. This removal is accomplished by melting the metal due to the heat of the glass. When these projections 11 are solid metal bodies, their temperatures at the start of the process for forming base plate 12 are such that upon removal of plate 12 and after inverting it, prior to fusing to back-up plate 16, the solid metal projections will be melted and flow from the cavities now defined in the glass. By such utilizations of the Keefer method it is possible, if desired, to provide cavities in plate 12 in which the cross section at the surface to be abutted by and fused to back-up plate 16 is smaller than the cross section at the base of the cavities. Such modifications of the present invention are particularly applicable in the manufacture of mirror blanks using glasses such as borosilicate glass and using fused quartz.

In the case of making mirror blanks of fused quartz, in accordance with the foregoing teaching of the present invention but without the modification to use the Keefer method, a material such as Glasrock would not be suitable. In its place one would use a material such as graphite to make projections 11. To minimize gas bubbles in the blank due to gas evolution, a vacuum can be imposed on the system. As an alternative to vacuum, any gas bubbles can be kept in the bottom of the molten quartz in the mold by using a pressurized system. When making the mirror of quartz, sand is placed in the mold having the cavity-forming projections and melted.

In this specification, as in the above-mentioned pending application, the terms beta-eucryptite crystals and beta-eucryptite-like crystals have been used in an alternative sense. Thus, while beta-eucryptite is often thought of as the species crystal having one mole of lithia, one mole of alumina and 2 moles of silica, both terms are used in this application to designate crystalline species having the beta-eucryptite structure, as shown by X-ray diffraction, but the peaks can be shifted slightly depending upon whether there is a definite amount of silica present other than exactly 2 moles, either more or less silica than the 2 moles. Similarly, the terms beta-spodumene crystals and beta-spodumene-like crystals are used alternatively and in a generic sense, specifying crystalline species that have the crystalline structure of beta-spodumene that contains 4 moles of silica to one of alumina and one of lithia, but with the peaks shifted somewhat when the crystalline structure contains more or less than 4 moles of silica. In the claims, therefore, the terms beta-eucryptite and beta-spodumene are each used in this generic sense.

It is seen from the foregoing description that the mirror blank and the mirror made therefrom of the present invention are made from, and thus comprise, two vitreous plates affixed or fused together. One plate, i.e., the base plate, has cavities extending from that face of the plate that is fused to the other plate, i.e., the back-up plate. The base of these cavities are spaced from the other face of the base plate to provide glass of some thickness from the base of these cavities to said face, which is to be ground and polished in the case of the mirror blank and which contains a reflecting surface in the case of the mirror.

When the base plate of the mirror or mirror blank is made of a completely vitreous material, the back-up plate may be made of a different vitreous material; however, to avoid the formation of stresses at the fusion plane between the two plates, due to temperature fluctuations in use, the materials of the two plates desirably have a minimum difference between their thermal coefficients of expansion and preferably the material of the two plates is the same glass composition. When the base plate of the mirror or mirror blank is a glass-ceramic and the mirror is to provide the minimum change in configuration with change in temperature, especially furnished by practically zero expansion glass-ceramic, the two plates must be formed from the same thermally crystallizable glass composition and fused together with the same heat treatment that produces the fusion or affixing of the two plates together as one blank and produces the crystallization to form the same glass-ceramic throughout the blank and, of course, throughout the final product, i.e., the mirror.

In such case, the two plates now glass-ceramic have the same physical characteristics that are necessary for minimizing stress production, configuration and size change in non-ground and non-polished areas during grinding and polishing and for best performance of the resultant mirror.

While the invention has been discussed in terms of telescope mirror blanks, it will be apparent that large shaped glass objects or articles can be formed by the process of the invention, particularly where it is important that such objects or articles be of light weight. Such articles, for example, can be used as structural units, including building blocks, panels, etc., in the building and construction industry.

Having defined the invention, what is claimed is:

1. A method of making a lightweight, low-expansion, crystallized, glass-ceramic telescope mirror blank comprising maintaining a molten, thermally crystallizable glass within a first zone while defining a plurality of cavities in one surface of said molten glass and gradually increasing the viscosity of said glass until glass is self supporting and said cavities are defined therein, maintaining a molten thermally crystallizable glass within a second zone and increasing the viscosity of said second molten glass until said second glass is self supporting, removing said glass from said zones after they have become self supporting, placing a surface of the glass formed in said second zone in adjacent contact with the surface of the glass formed in said first zone having said plurality of cavities defined therein, and subjecting said glasses to heat for a period of time sufficient to fuse said adjoining surfaces and thereafter thermally in situ crystallizing said glasses to form a transparent glass-ceramic telescope mirror blank having a plurality of cavities disposed throughout its inner portion.

2. The method as defined in claim 1 wherein said thermally crystallizable glass is of the $SiO_2$—$Al_2O_3$—$Li_2O$ system.

3. The method as defined in claim 1 wherein each of said plurality of cavities defined in said surface of the glass in said first zone has a configuration such that the cross-sectional area of the cavity is greatest at the surface of the glass and such area decreases as the cavity extends inwardly into said surface.

4. The method as defined in claim 1 wherein the surface of the glass and such area decreases as the cavity surface defining said cavities is maintained in a relatively concave configuration until the viscosity of said molten glass in said first zone is increased and said glass is self-supporting, to thus form a concave surface on said telescope mirror blank.

5. The method as defined in claim 1 wherein said thermally crystallizable molten glass has a composition consisting essentially of the following components present in the glass in the following weight percent ranges:

| Component | Weight percent |
|---|---|
| $SiO_2$ | 56–68 |
| $Al_2O_3$ | 18–27 |
| $Li_2O$ | 3.4–4.5 |
| CaO | 0–3 |
| ZnO | 0–2 |
| $B_2O_3$ | 0–4 |
| $TiO_2$ | 0–6 |
| $ZrO_2$ | 0–3 |
| MgO | 0–3 |
| $Na_2O$ | 0–1 |
| $P_2O_5$ | 0–3 |
| ($SiO_2$+$Al_2O_3$) | <82 |
| ($SiO_2$+$Al_2O_3$+$B_2O_3$+$P_2O_5$) | 86–91 |
| (CaO+MgO+ZnO+$Na_2O$) | 2.5–6 |
| ($SiO_2$+$Al_2O_3$+$P_2O_5$+$Li_2O$) | >93 |
| ($TiO_2$+$ZrO_2$) | 2–6 | wherein the ratio of $(CaO+MgO+ZnO+Na_2O+B_2O_3)$ to $Li_2O$ is less than 2.4 and the ratio of $SiO_2$ to $Al_2O_3$ is no more than 3.8.

6. The method as defined in claim 5 wherein the ratio of $SiO_2$ to $Al_2O_3$ is no more than 3.3 in said thermally crystallizable glass composition.

7. The method as defined in claim 5 wherein the amount of $(TiO_2+ZrO_2)$ is no more than about 3 weight percent in said thermally crystallizable glass composition and said $TiO_2$ is present in an amount of from about 1 to about 1.5 weight percent.

8. The method as defined in claim 5 wherein said thermally crystallizable glasses are subjected to a temperature range sufficient to thermally, in situ, crystallize said glasses to a transparent crystallized glass-ceramic containing as predominant crystalline species lithium-containing crystalline phases selected from the group consisting of beta-eucryptite, beta-spodumene, and mixtures thereof, said ceramic containing a multitude of such crystalline species in random orientation throughout said ceramic and dispersed in a glassy matrix remaining as a result of said in situ crystallization, substantially all of the crystals of said ceramic being of a diameter less than ⅓ micron measured along the longest lineal dimension of the crystals.

9. The method as defined in claim 5 wherein said telescope mirror blank has a lineal coefficient of thermal expansion within the range of from $10 \times 10^{-7}$ to minus $10 \times 10^{-7}$ over the temperature range of from zero to 300° C.

10. A method as defined in claim 1 comprising the additional step of forming a plurality of openings through the thickness of said second glass, said openings being spaced in such a manner as to have each opening disposed opposite to and communicating with one of said cavities in said glass formed in said first zone.

11. The method as defined in claim 1 wherein said glasses are in self supporting form in said first and second zone and are cooled to essentially a temperature suitable for fusion and are thereafter contacted to form the desired assembly and fused together, the assembly being nucleated at such temperature followed by a controlled rate of increase in temperature to complete the crystallization.

12. The method as defined in claim 11 wherein the molten glass used has a composition consisting essentially of the following components present in the glass in the following weight percent ranges:

| Component | Weight percent |
|---|---|
| $SiO_2$ | 56–68 |
| $Al_2O_3$ | 18–27 |
| $Li_2O$ | 3.4–4.5 |
| CaO | 0–3 |
| ZnO | 0–2 |
| $B_2O_3$ | 0–4 |
| $TiO_2$ | 0–6 |
| $ZrO_2$ | 0–3 |
| MgO | 0–3 |
| $Na_2O$ | 0–1 |
| $P_2O_5$ | 0–3 |
| $(SiO_2+Al_2O_3)$ | <82 |
| $(SiO_2+Al_2O_3+B_2O_3+P_2O_5)$ | 86–91 |
| $(CaO+MgO+ZnO+Na_2O)$ | 2.5–6 |
| $(SiO_2+Al_2O_3+P_2O_5+Li_2O)$ | >93 |
| $(TiO_2+ZrO_2)$ | 2–6 | wherein the ratio of $(CaO+MgO+ZnO+Na_2O+B_2O_3)$ to $Li_2O$ is less than 2.4 and the ratio of $SiO_2$ to $Al_2O_3$ is no more than 3.8 and wherein the thermal crystallization treatment results in a mirror blank of a glass-ceramic with a lineal coefficient of thermal expansion of zero $\pm 1 \times 10^{-7}$/° C. (0–300° C.).

13. The method as defined in claim 12 wherein the molten glass has an analyzed composition on a weight basis consisting essentially of about 67% $SiO_2$, 21% $Al_2O_3$, 2.6% CaO, 1% ZnO, 3.6% $Li_2O$, 1.9% $TiO_2$ and 2% $ZrO_2$.

14. A lightweight, low-expansion, crystallized glass ceramic telescope mirror blank made in accordance with the method as set forth in claim 1.

15. A lightweight, low-expansion, crystallized glass ceramic telescope mirror blank made in accordance with the method as set forth in claim 10.

References Cited

UNITED STATES PATENTS

| | | | |
|---|---|---|---|
| 1,934,798 | 11/1933 | Gelstharp | 65—44 |
| 2,045,716 | 6/1936 | McCauley | 65—93 XR |
| 2,102,049 | 12/1937 | Warren | 65—44 |
| 2,132,390 | 10/1938 | Blau | 65—33 |
| 3,113,877 | 12/1963 | Janakirama-Ras | 65—33 XR |
| 3,157,522 | 11/1964 | Stookey | 65—33 XR |
| 3,241,985 | 3/1966 | Kuwayama | 65—33 XR |
| 3,246,972 | 4/1966 | Smith | 65—33 XR |
| 3,320,044 | 5/1967 | Cole et al. | 65—44 |

FRANK W. MIGA, Primary Examiner

U.S. Cl. X.R.

65—33, 36, 44, 68; 106—52; 161—113; 350—288

PO-1050
(5/69)

UNITED STATES PATENT OFFICE
CERTIFICATE OF CORRECTION

Patent No. 3,484,327      Dated December 16, 1969

Inventor(s) R. R. Denman

It is certified that error appears in the above-identified patent and that said Letters Patent are hereby corrected as shown below:

Column 5, line 56, delete "39 lbs.1 oz" and insert therefor -- 15 lbs.,2.5 oz.--;

Column 5, line 57, delete "15 lbs.,2.5 oz." and insert therefor --39 lbs.,1 oz.--

SIGNED AND
SEALED
JUN 16 1970

(SEAL)
Attest:

Edward M. Fletcher, Jr.
Attesting Officer

WILLIAM E. SCHUYLER, J
Commissioner of Patent